United States Patent [19]

Sonku et al.

[11] Patent Number: 4,951,758
[45] Date of Patent: Aug. 28, 1990

[54] METHOD OF DRILLING A BRANCH LINE APERTURE AFTER INTERNAL LINING OF A PIPELINE AND A WATER PLUG USED IN THE METHOD

[75] Inventors: Masahisa Sonku, Hikone; Yukio Yoshimura, Kurita; Minoru Yasuhara, Isesaki; Naoki Kitahashi, Kusatsu; Hirozo Hirayama, Koka; Harutoshi Miyazaki, Kitasoma; Hisaichi Oi, Toride, all of Japan

[73] Assignee: Sekisui Kagaku Kogo Kabushiki Kaisha, Osaka, Japan

[21] Appl. No.: 415,357

[22] PCT Filed: Jan. 26, 1989

[86] PCT No.: PCT/JP89/00074

§ 371 Date: Sep. 26, 1989

§ 102(e) Date: Sep. 26, 1989

[87] PCT Pub. No.: WO89/07223

PCT Pub. Date: Aug. 10, 1989

[30] Foreign Application Priority Data

| Jan. 27, 1988 | [JP] | Japan | 63-16386 |
| Aug. 17, 1988 | [JP] | Japan | 63-204025 |
| Aug. 17, 1988 | [JP] | Japan | 63-204026 |
| Dec. 5, 1988 | [JP] | Japan | 63-307419 |
| Dec. 5, 1988 | [JP] | Japan | 63-307420 |

[51] Int. Cl.$^5$ ............ E02D 29/00; E03F 3/06; E21B 47/09; F16L 55/18
[52] U.S. Cl. .................... 175/40; 166/55.2; 166/66; 166/66.5; 166/255
[58] Field of Search .......... 166/250, 255, 66, 66.5, 166/55.2, 50; 175/40, 41, 24, 26

[56] References Cited

U.S. PATENT DOCUMENTS

| 3,019,841 | 2/1962 | Ternow | 166/255 X |
| 3,114,876 | 12/1963 | Schuster | 166/255 X |
| 4,442,891 | 4/1984 | Wood | 166/55.2 |
| 4,465,140 | 8/1984 | Hoehn, Jr. | 166/250 X |
| 4,572,293 | 2/1986 | Wilson et al. | 166/250 |

FOREIGN PATENT DOCUMENTS

| 0253588 | 1/1988 | European Pat. Off. |
| 3716568A1 | 12/1988 | Fed. Rep. of Germany |
| 2147080A | 5/1985 | United Kingdom |

Primary Examiner—Stephen J. Novosad
Attorney, Agent, or Firm—Armstrong, Nikaido, Marmelstein, Kubovcik & Murray

[57] ABSTRACT

This invention relates to a method of drilling apertures for branch lines (A) blocked by renovation lining of a main pipeline (B) which comprises setting a water plug (1) in the opening of each branch line (A) prior to lining, said water plug (1) carrying a position marker (14) comprising an antenna coil and a resonator adapted to be excited by a driving signal and, after stoppage of the driving signal, release a resonance signal remaining in the resonator from the antenna coil and said position marker being situated in a position which, upon setting of the water plug (1) in position, is substantially concentric with the axis of the branch line (A), causing an antenna assembly for detecting the resonance signal to travel within the main pipeline (B) to detect the position of the marker (14) and driving a drilling means (24) using the thus-detected marker position as a target from within the main pipeline.

8 Claims, 24 Drawing Sheets

METHOD OF DRILLING A BRANCH LINE APERTURE AFTER INTERNAL LINING OF A PIPELINE AND A WATER PLUG USED IN THE METHOD

TECHNICAL FIELD

The present invention relates to a method of drilling apertures for branch lines closed by internal lining in the renovation of an obsolete sewage, water supply, gas or other pipeline installed underground or within a structure.

BACKGROUND ART

Recently, a pipe lining technology called pipe renovation has been employed for reestablishing a pipeline by renovation of an obsolete sewage pipeline, for instance.

This pipe renovation is a technology which comprises lining an existing pipeline internally with a continuous strip of synthetic resin wound spirally and filling the gap between the new and old pipelines with a filling agent but when such pipe renovation technology is applied to an existing pipeline having side pipes (branch pipes), it is necessary to drill apertures for the branch lines after application of the filling agent.

Heretofore, where the existing line is made of a magnetic material such as iron, it has been proposed to detect its branch line openings with a magnetic sensor and drill apertures for the branch lines in the detected positions from within the new pipeline. (See, for example, Japanese Patent Publication KOKAI No. 127420/1981)

However, where the existing pipeline is made of a nonmagnetic magnetic material such as concrete, e.g. Hume concrete pipe, the above-mentioned method using a magnetic sensor cannot be employed.

It might be contemplated to insert a drilling machine into the branch line and drill an aperture from the branch line side but in the case of sewage line renovation, it is sometimes difficult to insert a drilling machine into the branch line depending upon the geometry of the pipeline system.

DISCLOSURE OF THE INVENTION

This invention relates to a method of drilling apertures for branch lines closed by the renovation lining of a main pipeline having such branched lines from the main pipeline side which comprises setting a water plug carrying a position marker consisting of an antenna coil and a resonator adapted to oscillate in response to a resonator driving signal and, after stoppage of said driving signal, release a resonance signal remaining in said resonator through said antenna coil in a position within a branch line opening where said position marker is in substantially concentric relation with the axis of the branch line prior to lining, causing an antenna assembly for detecting said resonance signal to travel within the main pipeline after lining to detect the position of said position marker and driving a drilling means using the detected position of said marker as a target to drill an aperture for said branch line from within the main pipeline.

The water plug according to the present invention has a position marker comprising an antenna coil and a resonator adapted to oscillate in response to a driving signal and, after stoppage of said resonator driving signal, release a resonance signal remaining in the resonator which is disposed in such a manner that the axis of said antenna coil is substantially concentric with the axis of the branch line.

According to the drilling method of this invention, the opening of a branch line blocked by renovation lining can be accurately detected and drilled from within the main pipeline. Moreover, by means of the water plug of this invention used in conjunction with an antenna assembly, the opening of the branch line can be accurately located from the main pipeline side.

BRIEF DESCRIPTION OF THE DRAWINGS

FIG. 1 is a sectional elevation view of the existing pipeline showing the robot and other equipment used in the plug mounting step;

FIG. 2 is a sectional elevation view showing the water plug set in position;

FIG. 3 is a sectional elevation view showing the condition of the pipeline after lining;

FIG. 4 is a sectional elevation view of the pipeline showing the robot and other equipment used in the marker position detecting step and aperture drilling step;

FIG. 5 is a sectional elevation view of the pipeline showing the drilling operation;

FIG. 6 is a sectional elevation view of the pipeline showing the condition immediately before the beginning of drilling.

FIG. 8 is a sectional elevation view of the pipeline showing the robot and other equipment used in the marker position detecting step and aperture drilling step;

FIG. 9 is a sectional elevation view of the pipeline showing the drilling operation;

FIG. 10 is a partial sectional elevation view of the pipeline showing another arrangement of the position marker and loop antenna;

FIGS. 11 and 12 are waveform diagrams illustrating changes in the signal level of the reception signal corresponding to the loop antenna resonance signal due to changes in the positional relationship between the loop antenna and the resonator.

FIG. 13 is a sectional elevation view of the pipeline showing the robot and other equipment used in the marker position detecting step and aperture drilling step;

FIG. 14 is a sectional elevation view showing the positional relationship between the first loop antenna and the water plug;

FIG. 15 is a waveform diagram illustrating changes in the signal level of the reception signal corresponding to the second loop antenna resonance signal due to changes in the positional relationship between the second loop antenna and the resonator;

FIG. 16 is a waveform diagram illustrating changes in the signal level of the reception signal corresponding to the first loop antenna resonance signal due to changes in the positional relationship between the first loop antenna and the resonator;

FIG. 17 is a sectional elevation view of the pipeline showing the drilling operation;

FIG. 18 is a side elevation view showing another example of the arrangement of the first loop antenna and second loop antenna;

FIG. 19 is a perspective view of the same.

FIG. 20 is a sectional elevation view of the pipeline showing the robot and other equipment used in the marker position detecting step and aperture drilling step;

FIG. 21 is a sectional elevation view of the pipeline showing the drilling operation;

FIG. 22 is a waveform diagram illustrating changes in the signal level of the reception signal corresponding to the resonance signal due to changes in the positional relationship between the loop antenna and the position marker in the axial direction of the main pipeline;

FIG. 23 is a schematic view showing the positional relationship between the loop antenna and the water plug in the axial direction of the main pipeline;

FIG. 24 is a waveform diagram illustrating changes in the signal level of the reception signal corresponding to the resonance signal due to changes in the positional relationship between the loop antenna and the position marker in the radial direction of the main pipeline;

FIG. 25 is a schematic view showing the positional relationship between the loop antenna and the water plug in the radial direction of the main pipeline.

FIG. 26 is a sectional elevation view of the existing pipeline showing the robot and other equipment used in the mounting of the plug;

FIG. 27 is a sectional elevation view showing the condition of the pipeline after lining;

FIG. 28 is a sectional elevation view of the pipeline showing the robot and other equipment used in the marker position detecting step and aperture drilling step;

FIG. 29 is a sectional view of the pipeline showing the drilling operation;

FIG. 30 is a waveform diagram illustrating the condition of reception of the resonance signal in the case where branch pipes are symmetrically located about the axis of the main pipeline;

FIG. 31 is a waveform diagram illustrating the condition of reception of the resonance signal according to the fifth example in the case where branch pipes are located symmetrically about the axis of the main pipeline;

FIG. 32 is a waveform diagram illustrating the condition of reception of the resonance signal in the case where branch pipes are located with the respective axes lying in offset relation;

and FIG. 33 is a waveform diagram illustrating the condition of reception of the resonance signal according to the fifth example in the case where branch pipes are located with the respective axes lying in offset relation.

BEST MODE FOR CARRYING OUT THE INVENTION

This invention will be described in further detail, reference being had to the accompanying drawings.

EXAMPLE 1

The drilling method of this invention includes a plug mounting step which comprises fitting a plug 1 carrying a position marker 14 into the opening of a branch pipe A prior to renovation lining, a marker position detecting step which comprises detecting the position of said marker after lining of the inner circumferential surface of an existing pipe 2, and an aperture drilling step which comprises drilling an aperture for said branch pipe from within the main pipe B.

First, the plug mounting step is described below with reference to FIG. 1.

Figure 1:
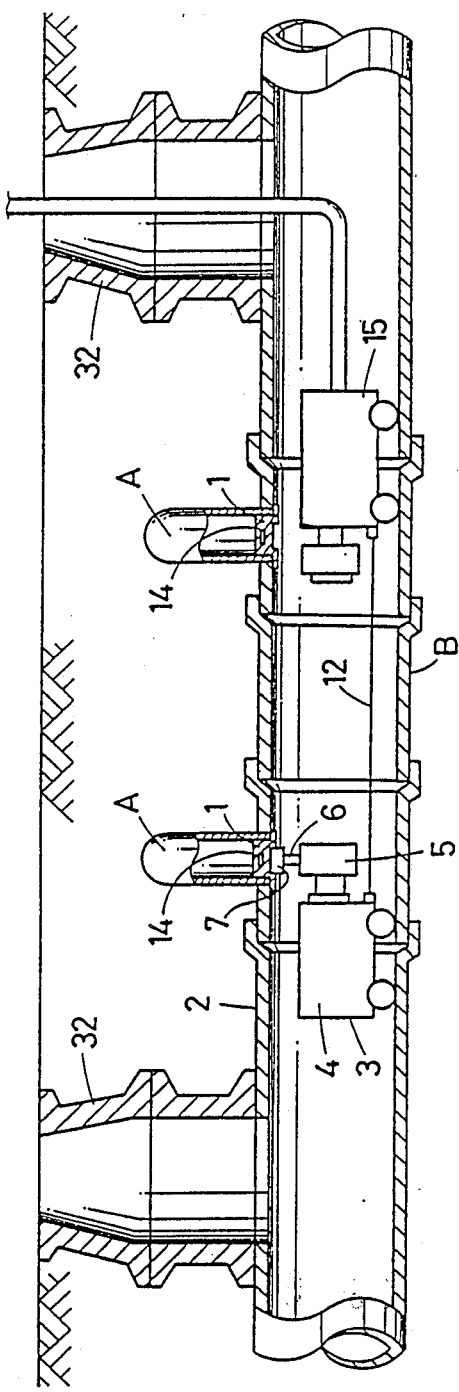
FIGS. 1 through 6 show a first example of the drilling method of this invention for drilling apertures for branch lines after renovation lining. Thus.

Referring to FIG. 1, a plug setting robot 3 to be used in this plug mounting step comprises a robot body 4 having a self-tracking means and a drive member 5 which is rotatable about an axis extending in a horizontal direction. The drive member 5 has a cylinder 6, whose cylinder head 7 is adapted to press the inner circumferential surface of the existing pipeline 2 in the radial direction thereof in the position where the rotation of said drive member 5 is stopped.

Figure 2:
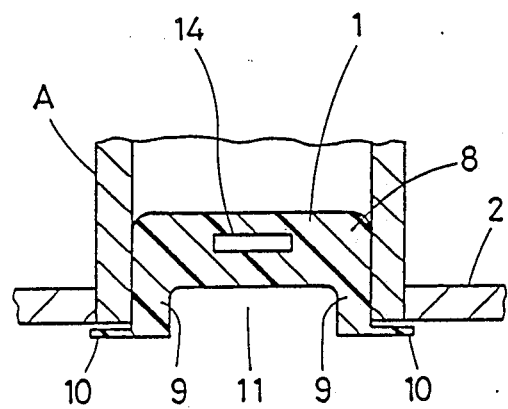

The water plug 1 is made of foam resin, such as polystyrene, polyurethane and other foams and as shown on an exaggerated scale in FIG. 2, the one used in this example is a cap-shaped element comprising a plug body 8 configured in the shape of a disk complementary to the inner circumference of said branch pipe A, a leg member 9 pending vertically from the periphery of said plug body 8 and a collar 10 formed at the free end of said leg member 9. In a recess 11 surrounded by said leg member 9 is fitted said cylinder head 7.

It is to be understood that since the water plug 1 used in the practice of this invention is ultimately destroyed by drilling along with the corresponding part of a new pipe 16, it is preferably made of an inexpensive solid closed-cell foam material but may also be a hollow or solid cup-shaped element made of, for example, a non-foamable resin.

Embedded in the center of said plug body 8 is a position marker 14, which is disposed in the position where, upon setting of plug body 8 in the opening of branch pipe A, the marker is located in substantially concentric relation with the axis of branch pipe A. This position marker 14 comprises an antenna coil and a resonator and is set in a position substantially concentric with the branch pipe axis, that is to say the position where the axis of the antenna coil coincides with said pipe axis. The said resonator is a piezoelectric oscillator such as, for example, a crystal oscillator. When a piezoelectric oscillator is used for the resonator, the amount of energy accumulated therein is so large that the resonance signal corresponding to a given driving signal can also be large. Therefore, the number of windings of the antenna coil need not be larger than several turns and, therefore, the position marker 14 as such can be of small size. It should be understood that the position marker 14 may comprise an ordinary LC resonance circuit. It is also to be noted that such position marker 14 need not necessarily be embedded in the center of the plug body 8 but may be affixed to the top or bottom of the plug body 8 only if it is located in substantially concentric relation with the axis of branch pipe A.

In this embodiment, the above-mentioned plug setting robot 3 is connected to a television camera assembly 15 through a traction wire 12 so that the video image of the opening of branch pipe A is photographed by this television camera assembly 15 and transmitted to the ground level. The operator on the ground controls the locomotion of the plug setting robot 3 and the driving of said cylinder 6 while watching the video image.

The operator then causes the recess 11 of the plug 1 to fit into the cylinder head 7' of the plug setting robot 3 and causes the robot and said television camera assembly 15 to travel together within the existing pipeline 2 before lining and photographing the opening of branch pipe A with the television camera assembly 15. Based on the video image photographed by the television camera assembly 15, the operator detects the opening of branch pipe A. The drive member 5 of the plug setting robot 3 is then brought to the detected position of the opening and the cylinder 6 is driven to extend the cylinder head 7 to set the plug 1 in position. In this procedure, since there are cases in which the branch pipe opening does not exist at the top of the pipeline, the robot is caused to travel while the drive member 5 is appropriately rotated by remote control. The water plug 1 may be set in position by suspending it on a rope or the like from the branch pipe A side. In such cases, however, the water plug 1 must be an expandable one. Thus, the water plug 1 in reduced diameter condition is carried to the necessary position and, then, its diameter is increased by feeding a fluid such as air or alternatively by supplying water to a water-expandable resin constituting the plug body 8.

Figure 3:
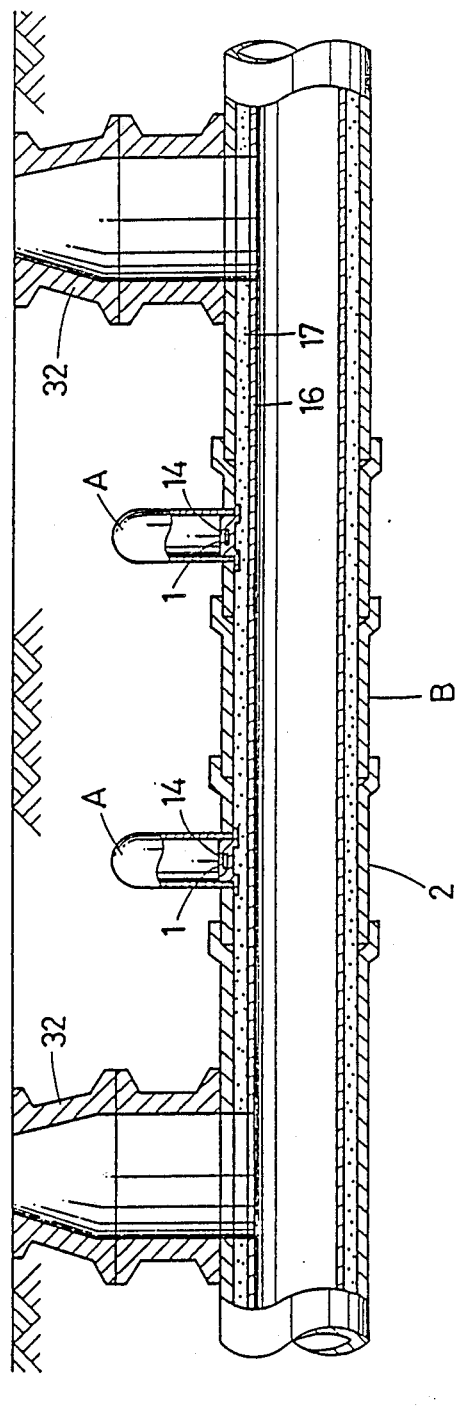

FIG. 3 shows the condition of the pipeline after lining by pipe renovation technology. Thus, the reference numeral 16 represents a new pipe and the reference numeral 17 represents a filling agent, such as mortar, filled into the gap between the old pipe 2 and the new pipe 16. When this pipe renovation technology is employed, the filling agent 17 is filled into the gap between the old and new pipes in the position of the opening of branch pipe A and, at the same time, this filling agent 17 raises the water plug 1 into the branch pipe A so that the plug 1 provides a hermetic seal of the opening of branch pipe A to prevent water leaks. There is no leakage of filling agent 17 into branch pipe A, either.

Figure 4:
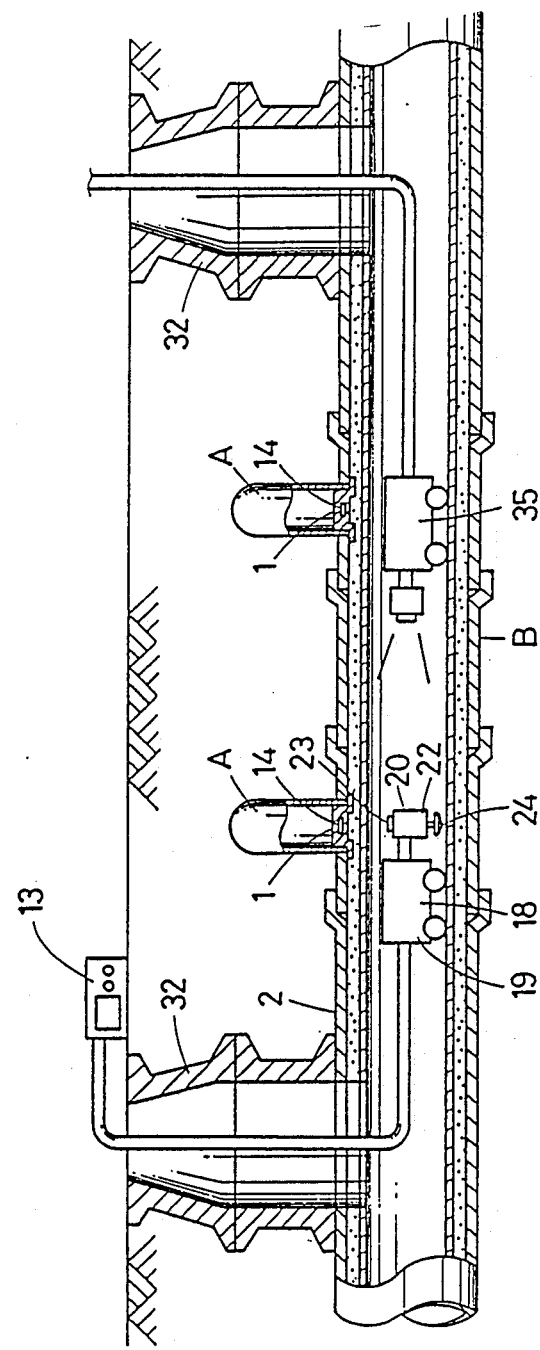

FIG. 4 is a schematic view illustrating a marker position detecting step which comprises detecting the position of said marker 14 after renovation lining and an aperture drilling step which comprises drilling an aperture for branch pipe A. A position detecting and drilling robot 18 to be used in these steps, just like the aforementioned plug setting robot 3, comprises a robot body 19 having a self-tracking means and a drive member 20. This drive member 20 has a rotary head 22, to one end of which is attached a loop antenna 23, while a conical drilling cutter, e.g. a carbide tool 24, is secured to the other end. The loop antenna 23 is switchable from a transmission mode to a reception mode or vice versa in predetermined cycles and is connected to signal processing circuits (not shown) corresponding to the respective modes. A television camera assembly 35 is intended to monitor the drilling operation and an instrument 13 installed above ground level is designed to provide a graphic display, for instance, of the signal reception characteristics of loop antenna 23. It should be understood that said drilling cutter 24 may be any other drilling device such as a water-jet system.

Figure 5:
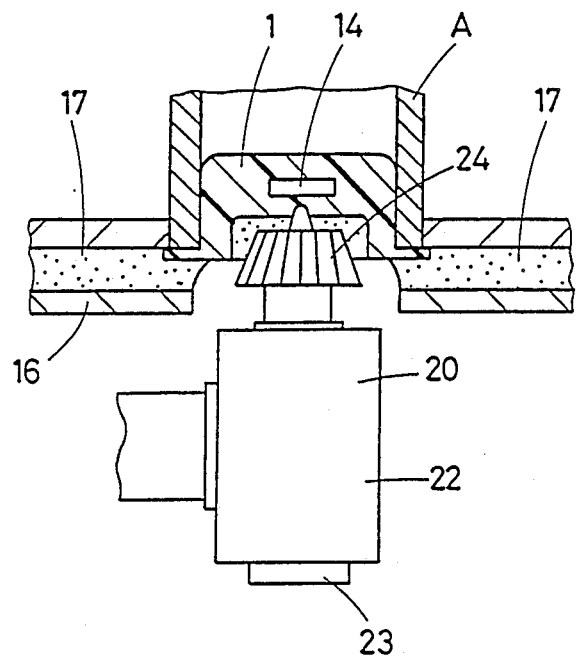
Figure 6:
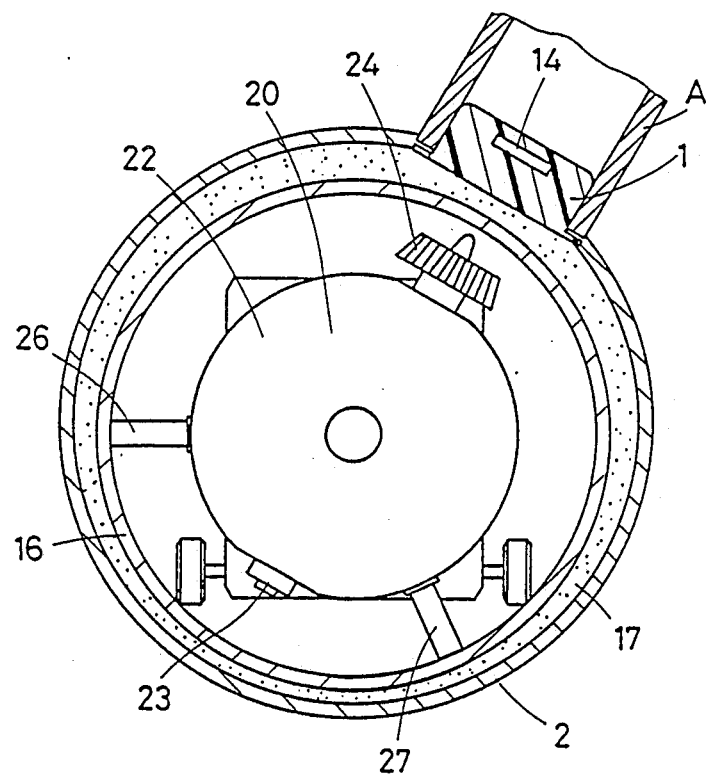

And from the loop antenna 23 on the transmission mode, a driving signal for oscillating the resonator of said position marker 14 is transmitted and this loop antenna 23 moves along with the position detecting and drilling robot 18. And as this loop antenna 23 comes into proximity with the location of the position marker 14 (the position in which the plug has been set), the resonator of position marker 14 oscillates with a predetermined resonance frequency and a resonance signal corresponding to the level of this oscillation is transmitted from the antenna coil. At this time, said loop antenna 23 is switched to the reception mode and, at the same time, the rotary head 22 is actuated to rotate the drive member 20, so that the position where the level of reception signal at the loop antenna 23 becomes maximal is detected. In this position, the actuation of rotary head 22 is stopped temporarily. Thereafter, this rotary head 22 is turned through 180 degrees to cause the drilling cutter 24 to be directed against the position where the reception signal level is maximal, that is to say the position where the position marker 14 is located (See FIG. 6). Now, the drilling operation is initiated (See FIG. 5). In this drilling step, the aforesaid water plug 1 is destroyed and flushed away into the new pipeline 16. In FIG. 6, the reference numerals 26 and 27 represent legs for supporting said rotary head 22 within the new pipeline 16.

Figure 7:
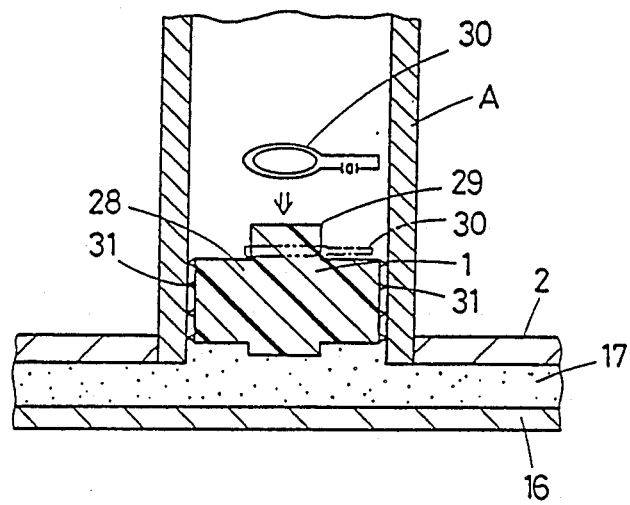
FIG. 7 is a sectional elevation view showing another example of the plug and other elements.

Referring to FIG. 7 which shows another example of water plug 1, a cylindrical plug body 28 is formed with a cylindrical projection 29 of reduced diameter in the top center thereof and the antenna coil of a position marker 30 is fitted to said projection 29. In this instance, the inner circumferential surface of branch pipe A provides an enhanced water sealing effect thanks to sealing rings 31 disposed at intervals in the direction of height of the periphery of the plug body 28. As an alternative, the plug body 28 may be constituted in the form of bellows.

The positional relationship between the loop antenna 23 and drilling cutter 24 mounted on the position detecting and drilling robot 18 is not limited to the above-described embodiment but these elements may be disposed apart in the front and rear positions, respectively, of the position detecting and drilling robot 18. Furthermore, the robot may actually be two independent robots, a position detecting robot and a drilling robot.

EXAMPLE 2

Another example of the drilling method according to this invention is described below with reference to FIGS. 8 through 12. Since this example is identical with Example 1 described hereinbefore up to the plug mounting step, only the marker position detecting and subsequent steps are described. It should be understood that the like reference numerals are used to denote the same elements as those constituting Example 1.

Figure 8:
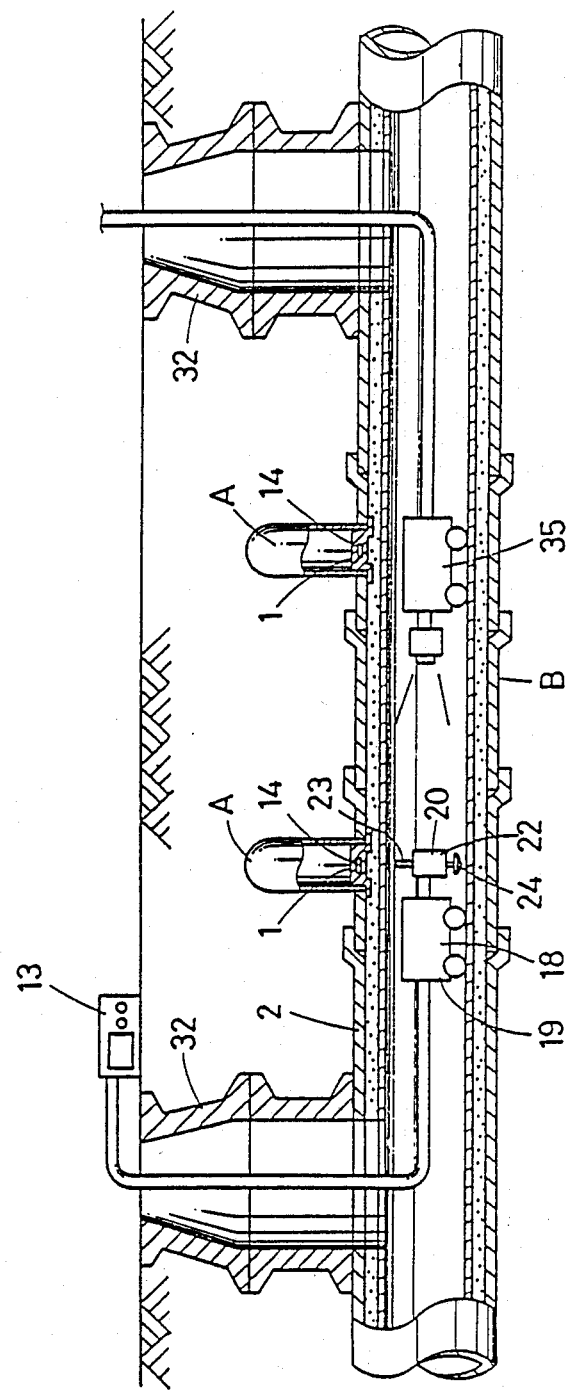
FIGS. 8 to 12 illustrate a second example of the method of drilling branch line apertures after renovation lining according to this invention. Thus.
Figure 9:
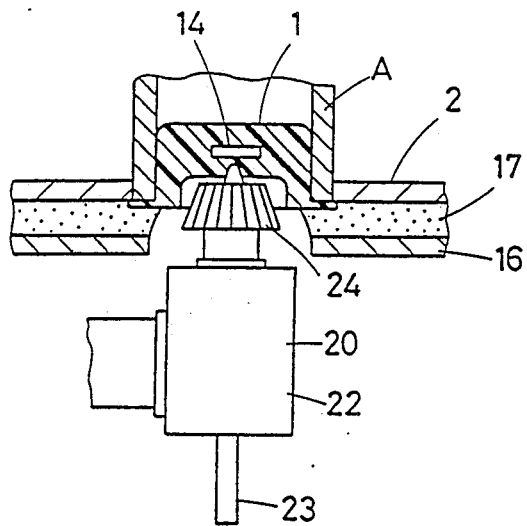
Figure 10:
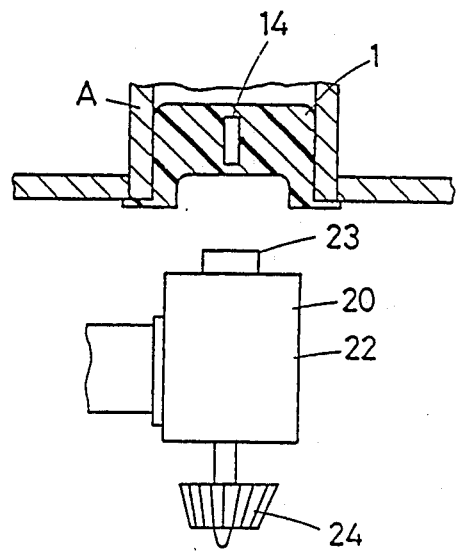
Figure 11:
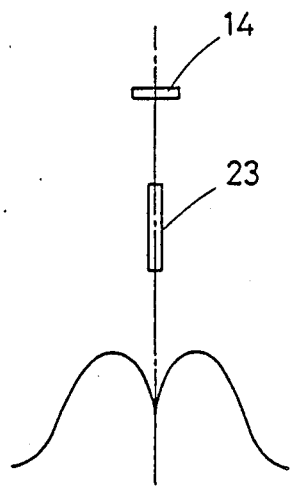
Figure 12:
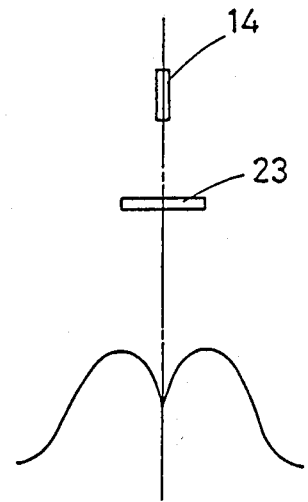

FIG. 8 is a schematic view illustrating the marker position detecting step for detecting the position of said marker 14 after lining and the aperture drilling step for drilling an aperture for branch pipe A. A position detecting and drilling robot 18 used in these steps comprises a robot body 19 having a self-tracking means and a drive member 20. This drive member 20 has a rotary head 22, to one end of which is attached a loop antenna 23, while a drilling cutter 24, which is a conical carbide tool, is secured to the other end. The loop antenna 23 is disposed so that its loop plane is parallel to the axis of the antenna coil of position marker 14, that is to say perpendicular to the axis of main pipe B. And this loop antenna 23 is switchable from a transmission mode to a reception mode or vice versa in predetermined cycles and is connected to signal processing circuits (not shown) corresponding to the respective modes. The position of loop antenna 23 is not limited to that indicated hereinbefore but may be such that its loop plane is parallel to both the axis of the antenna coil of said position marker 14 and the axis of main pipe B. In this instance, when the rotary head 22 is turned to detect the position where the reception signal level is minimal as described below, the detection of the point of minimal signal level can be more discrete than it is the case where the loop antenna 23 is desposed in the relative position described hereinbefore. It should also be noted that as illustrated in FIG. 10, when the axis of the antenna coil of said position marker 14 is perpendicular to the axis of branch axis A, said loop antenna 23 is disposed in such a manner that its loop plane is parallel to the axis of main pipe B. A television camera assembly 35 is intended to monitor the drilling operation and an instrument 13 installed above ground level is adapted to provide a graphic display, for instance, of the reception characteristics of loop antenna 23. The aforementioned drilling cutter 24 may be any other drilling means such as a water-jet system.

And from the loop antenna 23 on the transmission mode, a driving signal for oscillating the resonator of said position marker 14 is transmitted and this loop antenna 23 moves along with the position detecting and drilling robot 18. And as this loop antenna 23 comes into proximity with the location of the position marker 14 (the position in which the water plug 1 has been set), the resonator of position marker 14 oscillates with a predetermined resonance frequency and a resonance signal corresponding to the level of this oscillation is transmitted from the antenna coil. At this time, said loop antenna 23 is switched to the reception mode and, at the same time, the rotary head 22 is actuated to turn the drive member 20 and the position where the level of reception signal at the loop antenna 23 becomes maximal is detected (See FIG. 11). In this position, the rotation of the drive member 20 is stopped and, at the same time, the position detecting and drilling robot 18 is also stopped.

Thereafter, in this position, the rotary head 22 is turned through 180 degrees to cause the drilling cutter 24 to be directed against the position where the reception signal level is maximal, that is to say the position where the position marker 14 is located. Then, the drilling cutter 24 is actuated to start the drilling operation (See FIG. 9). In this drilling step, the aforesaid water plug 1 is destroyed and flushed away into the new pipeline 16.

The positional relationship between the loop antenna 23 and drilling cutter 24 attached to the position detecting and drilling robot 18 is not limited to the above-described embodiment but these elements may be disposed apart in the front and rear positions, respectively, of the position detecting and drilling robot 18. Moreover, the robot may actually be two independent robots, i.e. a position detecting robot and a drilling robot.

EXAMPLE 3

Now, still another example of the drilling method according to this invention is described below with reference to FIGS. 13 through 19. Since this example is identical with Example 1 described hereinbefore up to the plug mounting step, only the marker position detecting and subsequent steps are described below. It should be noted that the same elements as those constituting Example 1 are represented by the like reference numerals.

Figure 13:
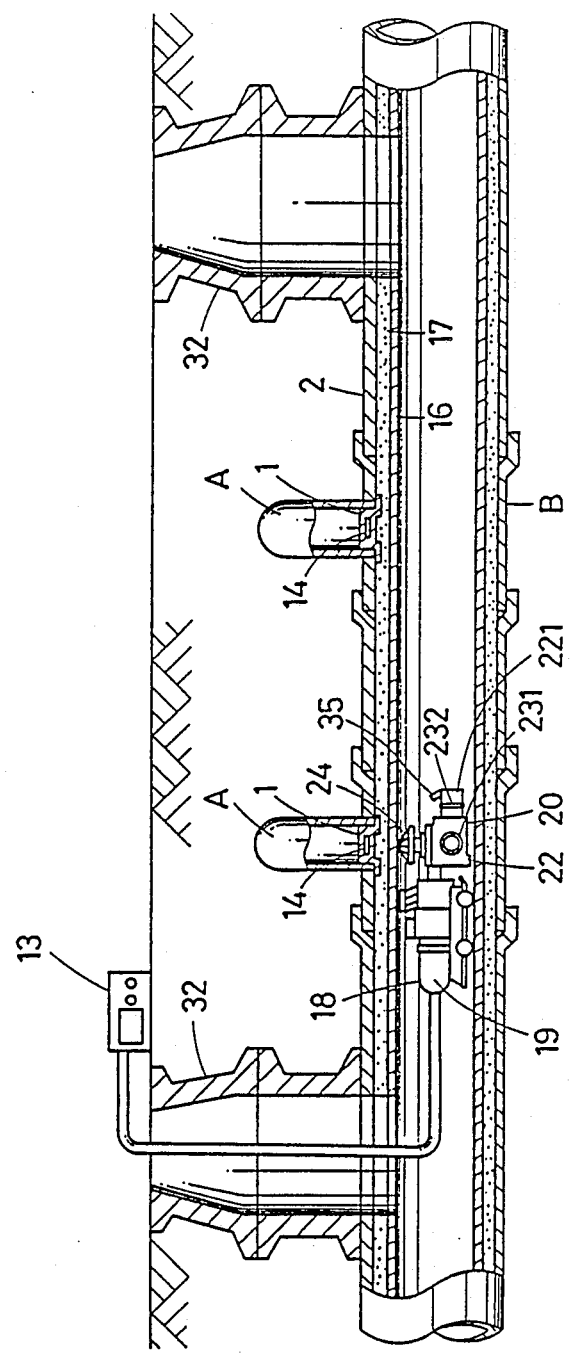
FIGS. 13 to 19 illustrate a third example of the method of drilling branch line apertures after renovation lining according to this invention. Thus.
Figure 14:
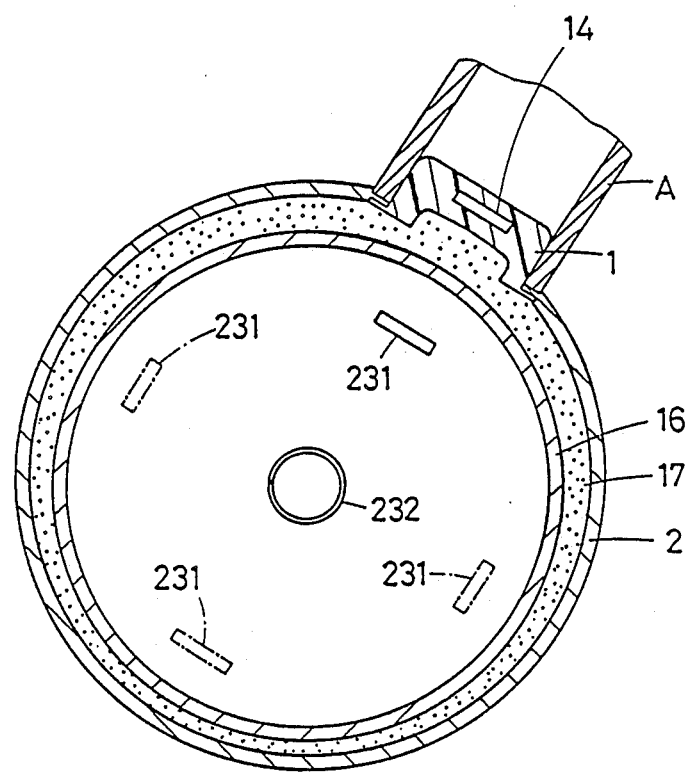
Figure 15:
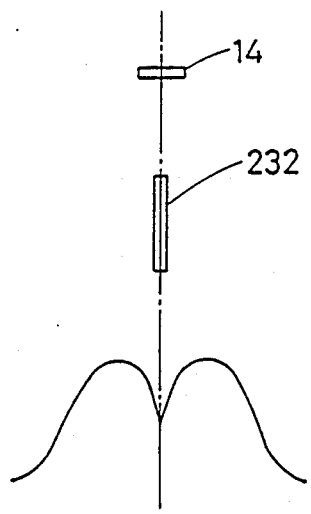
Figure 16:
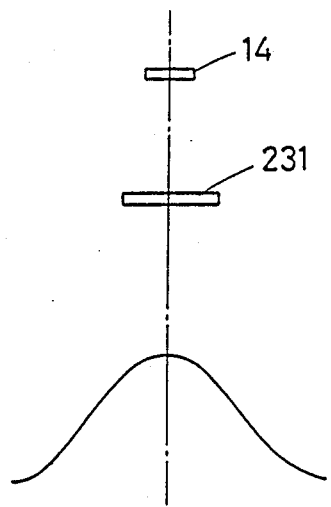
Figure 19:
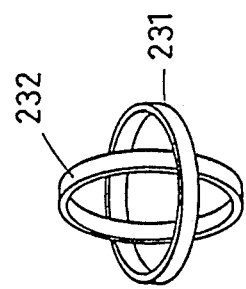
Figure 18:
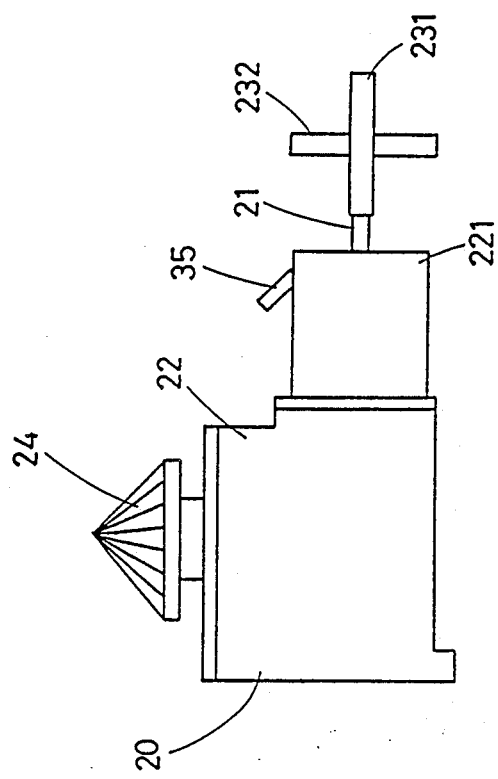

FIG. 13 is a schematic view illustrating a marker position detecting step for detecting the position of said marker 14 after renovation lining and an aperture drilling step for drilling an aperture for branch pipe A. A position detecting and drilling robot 18 used in these steps comprises a robot body 19 having a selftracking means and a drive member 20. This drive member 20 has a rotary head 22 and a first loop antenna 231 is mounted on top of said rotary head 22 while a second loop antenna 232 and a television camera assembly 35 are attached to a front part 221 of said rotary head 22. Furthermore, a drilling cutter 24, which is a conical carbide tool, is mounted on top of said rotary head 22. The first loop antenna 231 mentioned above is disposed in such a manner that its loop plane is perpendicular to the axis of the antenna coil of said position marker 14, that is to say in a position parallel to the axis of main pipe B. On the other hand, the second loop antenna 232 is disposed along the axis of the antenna coil of said position marker 14, that is to say in a position perpendicular to the axis of main pipe B. And the first loop antenna 231 and second loop antenna 232 are respectively switchable from a transmission mode to a reception mode or vice versa in predetermined cycles and are connected to signal processing circuits (not shown) corresponding to the respective modes. It should be understood that the first loop antenna 231 and second loop antenna 232 need not be disposed apart from each other as illustrated but may be integrally disposed as shown in FIGS. 18 and 19 wherein their respective loop planes are perpendicular to each other and the centers of the loop planes are coincidental. In the view, the reference numeral 21 represents a pivot shaft rotatably supporting these loop antennas 231 and 232 about the center axis of the second loop antenna.

The aforementioned television camera assembly 35 is intended to monitor the drilling operation and directed against the drilling cutter 24. A measuring instrument 13 installed above ground level is designed to provide a graphic display, for instance, of the respective reception characteristics of said first and second loop antennas 231, 232. It should be understood that said drilling cutter 24 may be any other drilling means such as a water-jet system.

And from the second loop antenna 232 on the transmission mode is transmitted a driving signal for oscillating the resonator of said position marker 14 and the first loop antenna 231 and second loop antenna 232 move together with the position detecting and drilling robot 18. And as the second loop antenna 232 approaches the region where the position marker 14 is located (the position of the water plug 1), the resonator of the position marker 14 oscillates with a predetermined resonance frequency and a resonance signal corresponding to the level of this oscillation is transmitted from the antenna coil. At this time, the second loop antenna 232 is switched to the reception mode and the position where the reception level at the second loop antenna 232 becomes minimal (See FIG. 15) is detected. In this position, the position detecting and drilling robot 18 is stopped. Then, the position detecting and drilling robot 18 is driven backward by the distance corresponding to that between the second loop antenna and first loop antenna in the axial direction of the pipeline and a driving signal is transmitted from the first loop antenna 231 for a predetermined time period. Thereupon, the position marker 14 oscillates again with a predetermined resonance frequency and a resonance signal corresponding to the level of oscillation is transmitted from the antenna coil. Therefore, while the rotary head 22 is turned slowly (See FIG. 14), this resonance signal is received with the first loop antenna 231 and the position where the reception level becomes maximal (See FIG. 16) is detected. In this position, the rotary head 22 is stopped. Since, in this example, the axis of the first loop antenna is in alignment with the axis of the drilling cutter 24, the drilling cutter 24 is actuated in the above condition to start drilling (See FIG. 7). In this drilling process, said water plug 1 is destroyed and flushed into the new pipeline 16.

Figure 17:
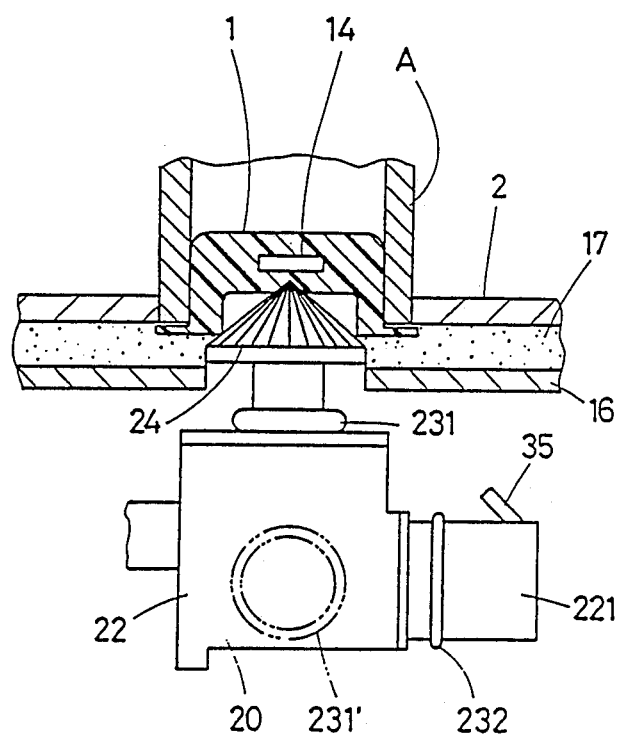

It should be understood that the first loop antenna 231 may be installed at one side of the rotary head 22 as indicated by two-dot broken lines in FIG. 17 instead of being disposed just below the drilling cutter 24. In this instance, after detection of the position of marker 14 in the radial direction of the main pipe by the first loop antenna 231', it is necessary to turn the rotary head 22 through 90 degrees in the direction from the drilling cutter 24 to the first loop antenna 231' so that the drilling cutter 24 is disposed just opposed against the position marker 14, that is to say the water plug 1.

Furthermore, when detecting the position of the position marker 14 in the axial direction of the main pipe by means of the second loop antenna 232, it may be so arranged that the resonance signal transmitted from the antenna coil of said marker 14 is received by the first loop antenna 231 while the position detecting and drilling robot 18 is driven forward and the rotary head 22 slowly turned to detect the position where the reception signal level becomes maximal and thereby ascertain the approximate position of said marker 14 and, then, this resonance signal is received by the second loop antenna 232 while the position detecting and drilling robot 18 is slowly driven forward or backward to detect the position where the reception signal becomes minimal. Then, the drilling cutter 24 is driven to start drilling. (See FIG. 17)

The positional relationship between the first and second loop antennas 231, 232 affixed to the position detecting and drilling robot 18 and the drilling cutter 24 is not limited to the above example but may be disposed apart from each other in the front and rear parts of the position detecting and drilling robot 18. Furthermore, the robot may actually be two robots, i.e. a position detecting robot and a drilling robot.

EXAMPLE 4

A still further example of the drilling method according to this invention is described below with reference to FIGS. 20 through 25. Since this example is identical with Example 1 described hereinbefore up to the plug mounting step, only the marker position detecting and subsequent steps are described below. It should be noted that elements similar to those described in connection with Example 1 are represented by the like reference numerals.

Figure 20:
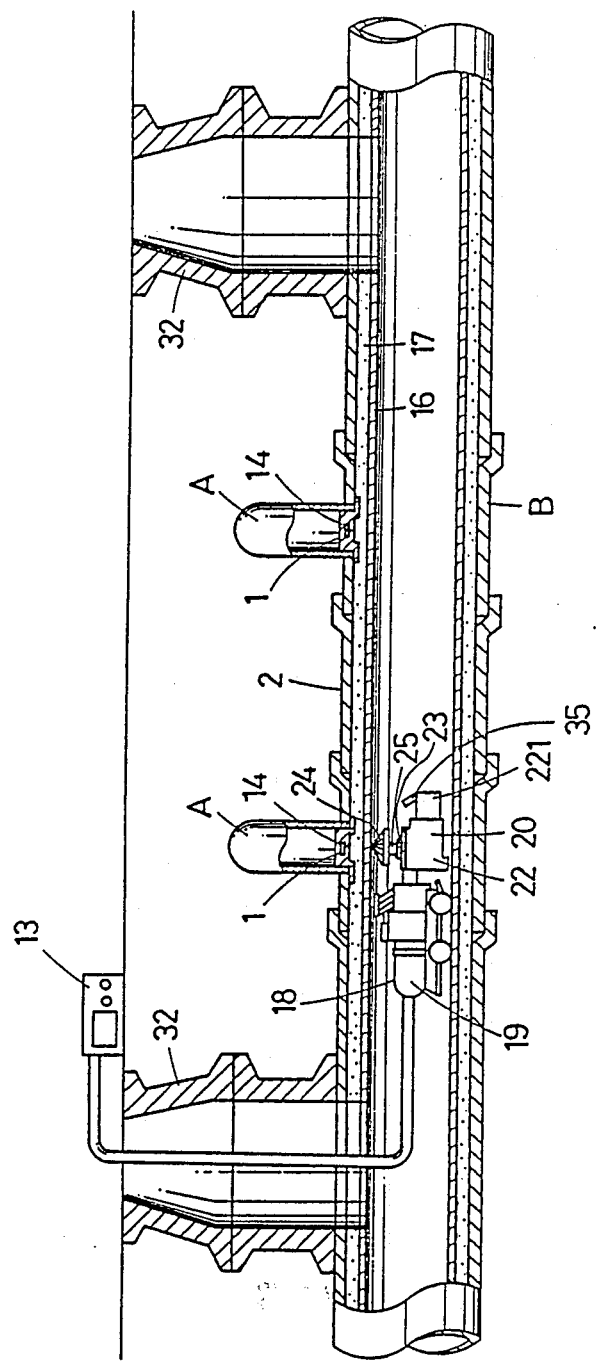
FIGS. 20 to 25 illustrate a fourth example of the method of drilling branch line apertures after renovation lining according to this invention. Thus.
Figure 21:
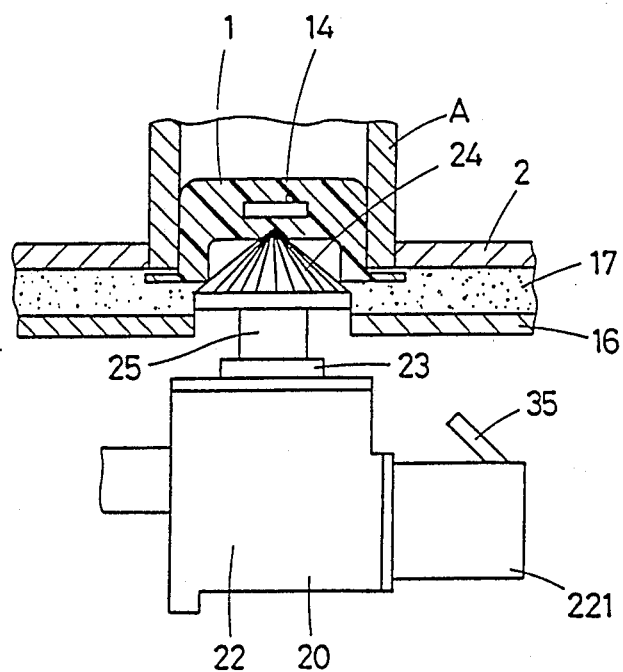
Figure 22:
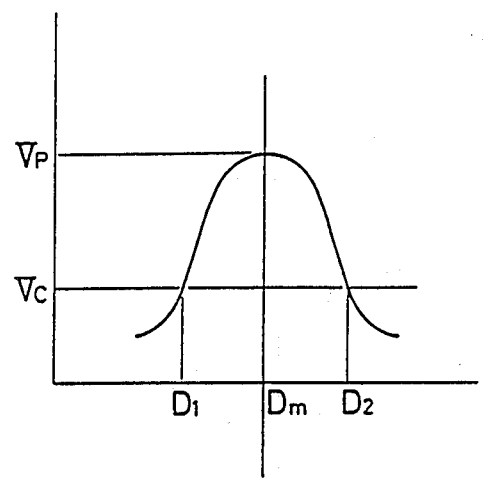
Figure 23:
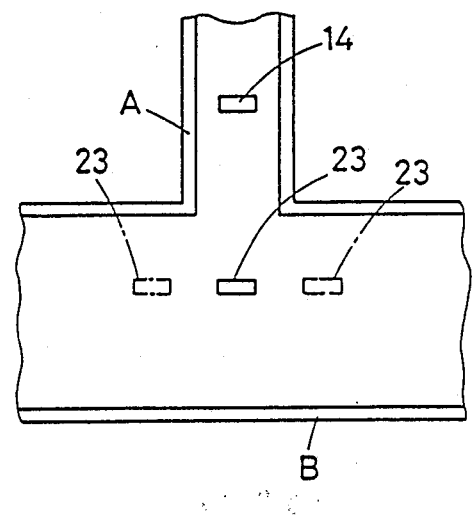

FIG. 20 is a schematic view illustrating a marker position detecting step for detecting the position of said marker 14 and an aperture drilling step for drilling an aperture for branch pipe A. A position detecting and drilling robot 18 used in these steps comprises a robot body 19 having a self-tracking means and a drive member 20. This drive member 20 has a rotary head 22, and a loop antenna 23 and a drilling cutter 24, which is a conical carbide tool, are coaxially mounted on top of said rotary head 22 in such a manner that the center of the loop plane of loop antenna 23 lines up with the axis of a drive shaft 25 of said drilling cutter. And the loop antenna 23 is disposed in such a manner that its loop plane is parallel to the axis of main pipe B, that is to say perpendicular to the axis of the antenna coil of said position marker 14. Moreover, affixed at a forward end 221 of said rotary head 22 is a television camera assembly 35 for monitoring the condition of drilling by said drilling cutter 24. It should be understood that the drilling cutter 24 may be any other drilling means such as a water-jet system. The position detecting and drilling robot 18 so constructed is connected a control unit 13 installed above ground level.

Figure 24:
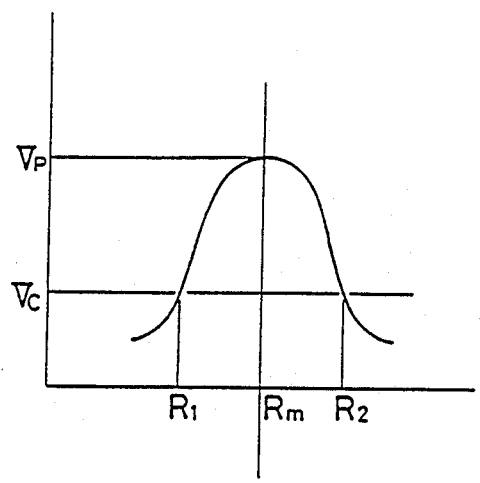
Figure 25:
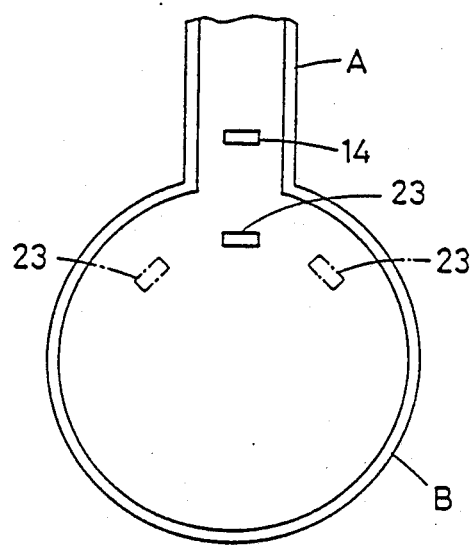

And from the loop antenna 23 on the transmission mode, a driving signal for oscillating the resonator of said position marker 14 is transmitted and this loop antenna 23 travels along with the position detecting and drilling robot 18 within the main pipe B. And as the loop antenna 23 approaches the region where the position marker 14 is located (the position in which the water plug 1 has been installed), the resonator of the position marker 14 oscillates with a predetermined resonance frequency and a resonance signal corresponding to the level of oscillation is transmitted from the antenna coil. At this time, the loop antenna 23 is switched to the reception mode and its reception characteristics are displayed by a display means (for example, a meter) of said control unit. In other that the resonance signal may be positively received even in the presence of noise, the sensitivity of the loop antenna 23 is set high. As the position detecting and drilling robot 18 advances further and the loop antenna 23 approaches the position of marker 14, the signal level of the resonance signal becomes higher by degrees to ultimately reach a maximum, while the signal level becomes lower as the loop antenna 23 moves away from the position marker 14. In the position where there is substantially no change in this signal level, the position detecting and drilling robot 18 is topped and a reference level lower than the maximal value of said signal level is set in a signal processing circuit (not shown) in the control unit 13 connected to the loop antenna 23. This set reference value is preferably about 40 to 80% of said maximum value for assuring a high detection accuracy but need not necessarily be within this range. Then, the sensitivity of the loop antenna 23 is lowered to a level where no saturation occurs and, thereafter, the position detecting and drilling robot 18 is driven backward. Thereupon, the signal level of the resonance signal received by the loop antenna 23 changes in the same manner as it is the case when the robot 18 is driven forward so that the signal level reaches the aforementioned reference level twice in the vicinity of the maximum value of signal level (See FIG. 22). It is so arranged that with these two points taken as base points $D_1$ and $D_2$, the arrival of the loop antenna 23 at $D_1$ and $D_2$ can be detected by means of illumination or alarming sound. This detection of base pionts $D_1$ and $D_2$ can be easily accomplished by incorporating an appropriate circuit within the signal processing circuit for the loop antenna 23. And the positions of the position detecting and drilling robot 18 corresponding to the above two base points $D_1$ and $D_2$ are read on a distance meter in the control unit 13, for instance. Since the above-mentioned two base points $D_1$ and $D_2$ are both apart from the position where the resonance signal level becomes maximal by the same distance, the median point Dm between the two base points $D_1$ and $D_2$ is calculated and the position detecting and drilling robot 18 is shifted so that the loop antenna 23 and, hence, the drilling cutter 24 are located at said median point Dm. The drilling cutter 24 has thus been located in the position corresponding to the position marker 14 in the axial direction of main pipe B. However, at this stage, it is unknown yet where, in the radial direction of the main pipe B, the position marker 14 is located. Therefore, a driving signal is transmitted again from the loop antenna 23 and at the same time, the rotary head 22 is turned. Thereupon, the resonator of the position marker 14 oscillates again and a resonance signal is transmitted from the antenna coil of the resonator. At this time, the loop antenna 23 is switched to the reception mode and said resonance signal is received by the loop antenna 23. In this stage, the reception sensitivity of loop antenna 23 is set at a level where no saturation occurs. Since the changes in resonance signal level in this case are similar to those described in connection with position detection in the axial direction of main pipe B as shown in FIG. 24, a reference level Vc lower than the maximal value Vp is similarly set and the two base points $R_1$ and $R_2$ reaching the reference level Vc are determined. Then, the median point Rm between the two base points $R_1$ and $R_2$ is calculated and the angle of rotation of the rotary head 22 is adjusted so that the loop antenna 23 is brought to this median point Rm. The free end of the drilling cutter 24 has thus been directed against the position marker 14. And the drilling cutter 24 is driven to start drilling (See FIG. 21). In this drilling process, said water plug 1 is destroyed and flushed into the new pipeline 16.

While, in the above embodiment, the position of the position marker 14 in the axial direction of main pipe B is detected by causing the loop antenna 23 to pass the position marker 14 to detect the maximum value of resonance signal level and, then, moving the loop antenna 23 backward to detect two base points $D_1$ and $D_2$, this arrangement is intended to prevent an erroneous detection of base points $D_1$ and $D_2$ due to the saturation occurring from a high reception sensitivity of the loop antenna 23 and obtain a maximum value Vp prior to setting of reference level Vc. Therefore, when the sensitivity of loop antenna 23 need not be set so high and the maximum value Vp of resonance signal level is known, the position of position marker 14 in the axial direction of main pipe B may be found simply by detecting the two base points $D_1$ and $D_2$. Furthermore, it may be so arranged that all the detection steps described above are controlled by a microcomputer.

EXAMPLE 5

Figure 30:
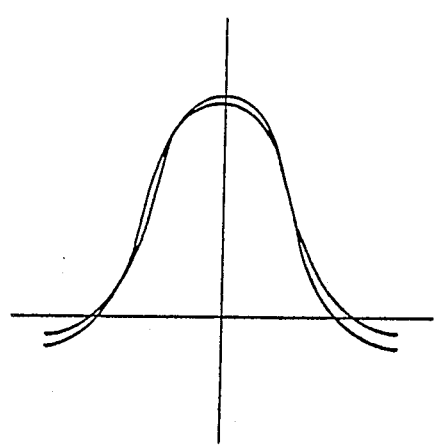

While the position of the branch pipe opening can be accurately detected by any of the drilling methods described in the foregoing examples, the detection of branch pipe openings may be difficult when two or more branch pipe openings exist close to each other. Thus, when branch pipe openings are located symmetrically about the axis of main pipe B (See the branch pipe openings $A_1$ and $A_2$ shown at left in FIG. 26), the respective resonance signals transmitted from the position markers of the water plugs set in the branch pipe openings are received in virtually overlapping relation as illustrated in FIG. 30. Furthermore, when branch pipe openings are located close to each other with the respective axes being slightly offset (See the branch pipe openings $A_3$ and $A_4$ shown at right in FIG. 26), the resonance signals transmitted from the position markers of the water plugs set in the respective branch pipe openings are received with the respective maximal values being close to each other. If this occurs, it will be virtually impossible to detect the maximum value of resonance signal level with accuracy, with the result that it becomes difficult to detect the position of the branch pipe opening.

Therefore, this example provides a drilling method by which the branch pipe opening can be accurately detected for drilling even in the case where a plurality of branch pipes are located close to each other.

In the following description, reference is had to FIGS. 26 to 29, FIG. 31 and FIG. 33.

This example includes a plug mounting step for setting plugs 111, 112 ... carrying position markers 141, 142 ... in the openings of branch pipes $A_1$, $A_2$ ..., a marker detecting step following renovation lining of an existing pipeline for detecting the positions of said markers, and an aperture drilling step for drilling apertures for said branch pipes from within the main pipe B.

Figure 26:
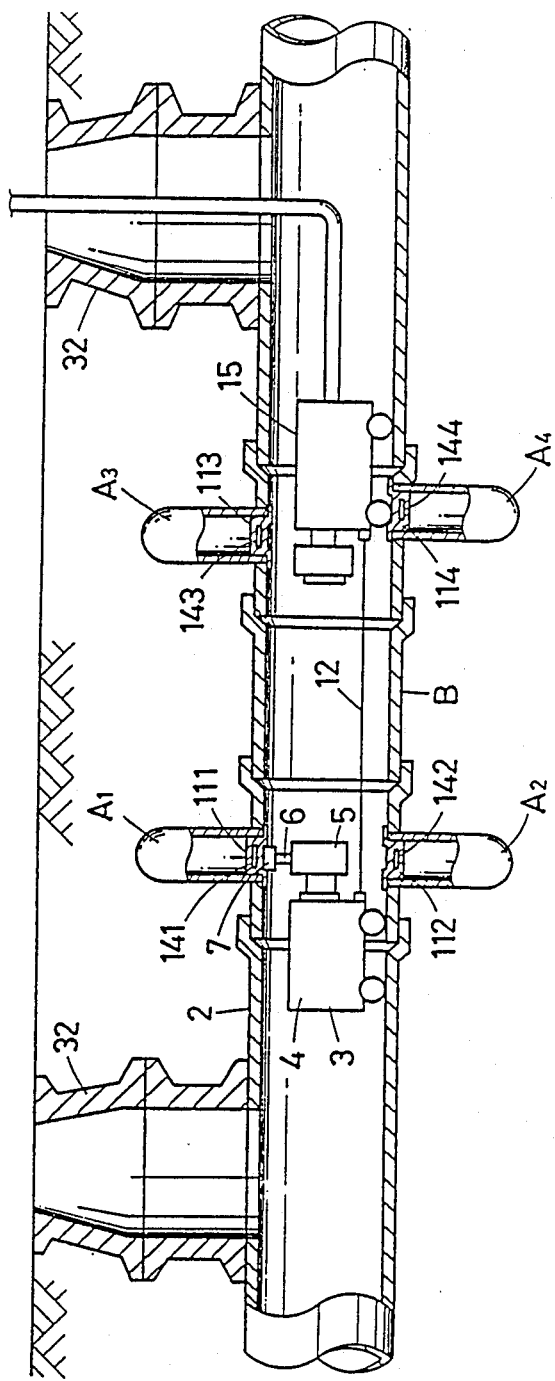
FIGS. 26 to 33 illustrate a fifth example of the method of drilling branch line apertures after renovation lining according to this invention. Thus.

The plug mounting step is the same as that described in the foregoing examples (See FIG. 26) and the plug setting robot 3 used in this step is of the same construction as that used in the preceding examples. Where two branch pipes $A_1$, $A_2$ exist in close proximity with each other as illustrated in FIG. 26, the water plugs to be set in the openings of the respective branch pipes $A_1$, $A_2$ are water plugs 111 and 112 carrying position markers 141 and 142 which are different in the frequency of resonance signal. The frequencies of resonance signals from the position markers 141 and 142 of these water plugs 111 and 112 can each be varied by changing the intrinsic oscillation frequency of said piezoelectric oscillator or LC resonance circuit. Assuming that the frequency range is of the order of 10 MHz, the difference between the frequencies of resonance signals from position markers 141 and 142 is preferably about 100 KHz. Thus, if the frequency of resonance signal from the position marker 141 of one water plug 111 is assumed to be 10.7 MHz, that from the position marker of the other water plug 112 may be set at 10.6 MHz. And in setting the water plugs 111, 112 ... in the openings of the respective water branch pipes $A_1$, $A_2$ ..., it is recommended to increase or decrease the frequencies of resonance signals from the position markers 141, 142 ... of the respective water plugs 111, 112 ... in a serial fashion, for the subsequent detection procedure may then be carried out more efficiently. Furthermore, in mounting the water plugs 111, 112 ..., it is advisable to confirm the frequencies of said respective resonance signals beforehand and record which of the water plugs having such specific frequencies has been set in the opening of a given branch pipe. Referring to FIG. 26, the two branch pipes $A_1$ and $A_2$ situated at left are reasonably apart from the two branch pipes $A_3$ and $A_4$ situated at right and there is no risk of interference in resonance signal. Therefore, in this case, the same water plugs 111 and 112 as those set in the two branch pipes $A_1$ and $A_2$ situated at left can be set in the branch pipes $A_3$ and $A_4$ situated at right.

Figure 27:
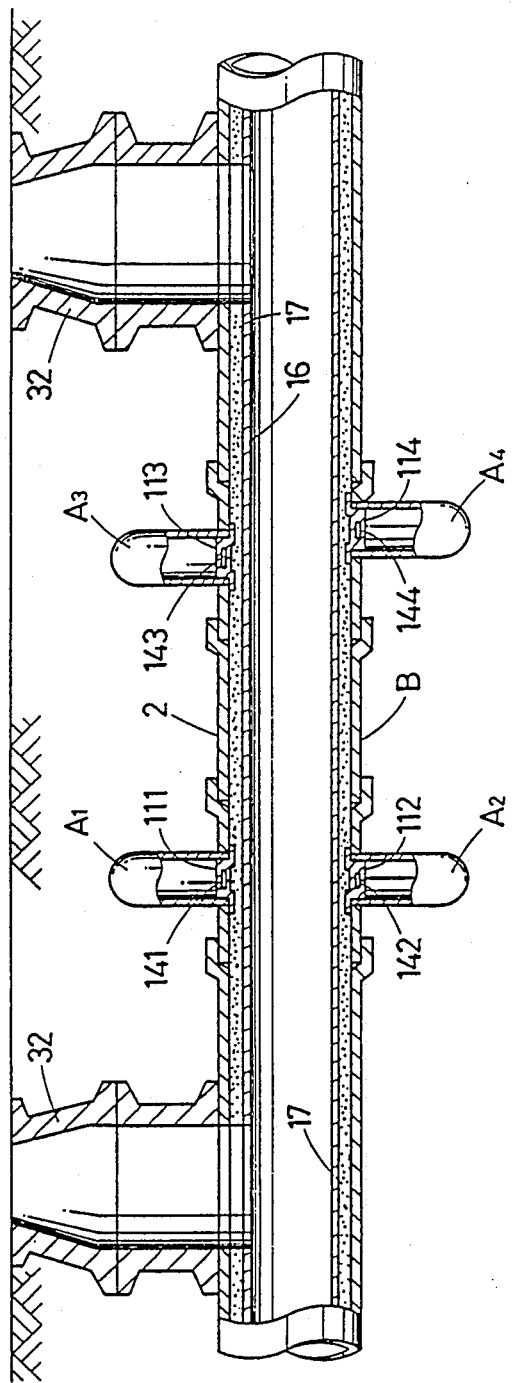

After the water plugs 111, 112 ... have thus been set in the respective branch line openings, the main pipe is lined according to the principle of pipe renovation. The lined pipe structure is shown in FIG. 27. In the view, the reference numeral 16 represents a new pipe and the reference numeral 17 represents a filling agent, such as morter, disposed between old pipe 2 and new pipe 16.

Figure 28:
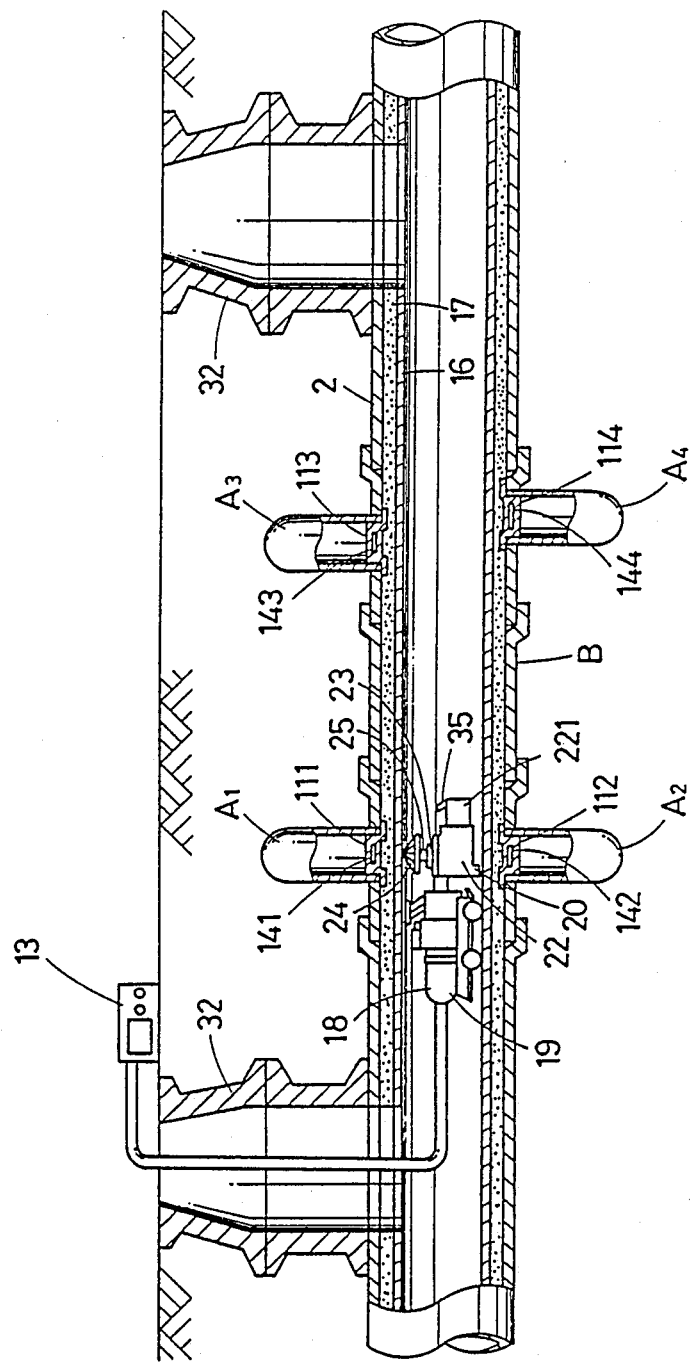
Figure 29:
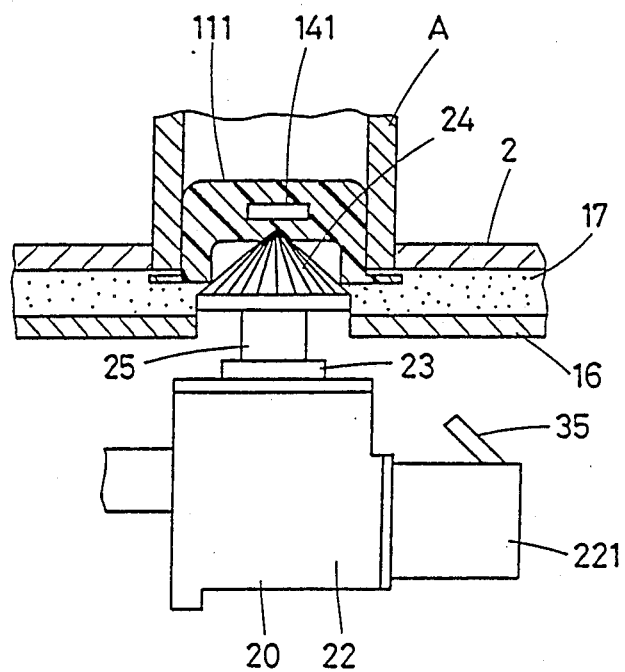

FIG. 28 is a schematic view illustrating the marker detecting step following renovation lining which comprises detecting the positions of said markers 141, 142 . . . and an aperture drilling step which compries drilling apertures for respective branch pipes A. The position detecting and drilling robot 18 used in these steps is of the same construction as that described in Example 4 and is connected to a control unit 13 installed above ground level.

Figure 31:
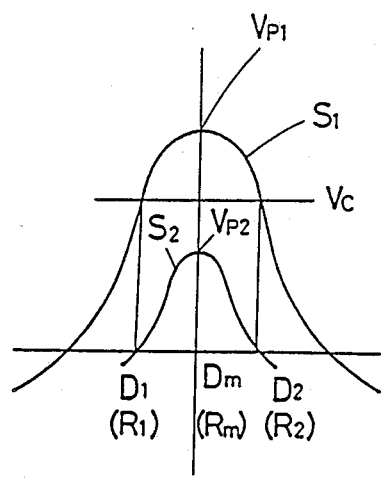
Figure 32:
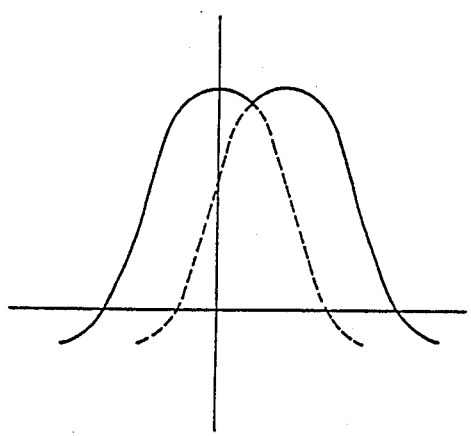

And from the loop antenna 23 on the transmission mode, a driving signal for oscillating the resonators of said position markers 141, 142 . . . , and this loop antenna 23 travels along with the position detecting and drilling robot 18 within main pipe B. And as the loop antenna approaches the regions where the position markers 141, 142 are located (the positions of installation of water plugs 111, 112), the resonators of position markers 141, 142 oscillate with predetermined frequencies and resonance signals $S_1$, $S_2$ corresponding to the levels of oscillation are transmitted from the antenna coil. At this moment, the loop antenna 23 is switched to the reception mode, whereupon the reception characteristics are displayed on a display (for example, a meter) of said control unit and the reception frequency of the loop antenna 23 is tuned to the frequency of the resonance signal $S_1$ transmitted from the position marker 141 set in the opening of branch pipe $A_1$. At this moment, another resonance signal $S_2$ is also transmitted from the position marker 142 set in the opening of branch pipe $A_2$ which is located in opposite position with respect to said branch pipe $A_1$, so that the loop antenna 23 receives these two resonance signals $S_1$, $S_2$ concurrently. In this stage, the sensitivity of the loop antenna 23 has been set high in order that the target resonance signal $S_1$ may be positively received even in the presence of noise. As the position detecting and drilling robot 18 advances further and approaches the installation positions of markers 141 and 142, the signal levels of resonance signals $S_1$, $S_2$ of the respective markers 141, 142 increase by degrees and ultimately reach maxima, after which they decrease by degrees as the loop antenna 23 travels away from the installation positions of markers 141, 142. Since the two resonance signals $S_1$ and $S_2$ are different in frequency as mentioned above and the reception frequency of the loop antenna 23 has been tuned to the frequency of one of resonance signals $S_1$ and $S_2$, the waveforms of the received resonance signals are dissimilar as shown in FIG. 31 and there is a marked difference between the maximal values $V_{p_1}$ and $V_{p_2}$ of signal level of the two resonance signals $S_1$ and $S_2$. Assuming, for example, that the frequency of resonance sighal $S_1$ from one position marker 141 is 10.7 MHz and that of resonance signal $S_2$ from the other marker 142 is 10.6 MHz, the difference between the maximal values $V_{p_1}$ and $V_{p_2}$ of signal level of these resonance signals $S_1$ and $S_2$ will be about 2.5 V. Then, in the position where said signal level $S_1$ has ceased to change appreciably any longer, the position detecting and drilling robot 18 is stopped and in the signal processing circuit (not shown) within the control unit 13 connected to the loop antenna 23, the reference level Vc is set to a value which is lower than the maximal value $V_{p_1}$ of signal level of resonance signal $S_1$ from one position marker 141 and higher than the maximal value $V_{p_2}$ of signal level of resonance signal $S_2$ from the other position marker 142.

Assuming that the difference between the two maximal values $V_{p_1}$ and $V_{p_2}$ is 2.5 V as mentioned above, the value of this reference level Vc may, for example, be lower by about 1 V from the larger maximal value $V_{p_1}$, although this value is merely illustrative. Then, the sensitivity of the loop antenna 23 is lowered to a level where no saturation occurs and the position detecting and drilling robot 18 is driven backward. Thereupon, the signal levels of resonance signals $S_1$ and $S_2$ received by the loop antenna 23 change in the same fashion as it is the case when the robot 18 travels forward and only the signal level of resonance signal $S_1$ from one position marker 141 reaches said reference level Vc twice. Therefore, it is so arranged that with these two points of arrival being taken as base points $D_1$ and $D_2$, the arrival of loop antenna 23 at these base points $D_1$ and $D_2$, may be ascertained by means of illumination or sound means. The detection of base points $D_1$ and $D_2$ can be easily accomplished by providing the signal processing circuit for loop antenna 23 with an appropriate circuit. And the positions of the position detecting and drilling robot 18 corresponding to said two base points $D_1$ and $D_2$ are read on a distance meter, for instance, in the control unit 13. Since the above-mentioned two base points $D_1$ and $D_2$ are equi-distant from the position where the signal level of resonance signal $S_1$ reaches the maximal value $V_{p_1}$, a median point Dm between these two base points $D_1$ and $D_2$ is calculated and the position detecting and drilling robot 18 is shifted so that the loop antenna 23 and, hence, the drilling cutter 24 will be located at this median point Dm. By this procedure, the drilling cutter 24 is positioned where, in the axial direction of main pipe B, the position marker 141 is situated. However, at this moment, it is unknown yet where, in the radial direction of main pipe B, the position marker 141 is situated. Therefore, a driving signal is transmitted again from the loop antenna 23 and the rotary head 22 is turned. Thereupon, the resonators of position markers 141 and 142 are caused to oscillate again and consequently resonance signals $S_1$ and $S_2$ are transmitted from the antenna coils of the respective resonators. At this moment, the loop antenna 23 is switched to the reception mode so that said resonance signals $S_1$ and $S_2$ are received by the loop antenna 23. In this stage, the reception frequency of loop antenna is kept at the above-mentioned frequency and the sensitivity is held at a level where no saturation takes place. Since changes in the signal levels of resonance signals $S_1$ and $S_2$ here are the same as it is the case in the above-described position detection in the axial direction of main pipe B, two base points $R_1$ and $R_2$ where the reference level Vc is reached are detected (See FIG. 31). And a median point Rm between the two base points $R_1$ and $R_2$ is calculated and the angle of rotation of the rotary head 22 is set so that loop antenna 23 will be situated at this median point Rm. By this preocedure the tip of the drilling cutter 24 is directed against the position marker 141. Then, the drilling cutter 24 is actuated to start drilling (See FIG. 29). In this drilling step, said water plug 111 is destroyed and flushed into the new line 16. Thereafter, all the signal received by the loop antenna 23 is the resonance signal $S_2$ from the remaining position marker 142. This time, therefore, the reception frequency of loop antenna 23 is tuned to the frequency of the resonance signal $S_2$ from the resonator of this position marker 142. Thereupon, the signal level of said resonance signal $S_2$ exceeds said reference level Vc. Therefore, in the same manner as above, two base points are detected for each of the axial and radial directions of the main pipe and a median point is calculated to find the position of the remaining marker 142. In detecting this position of the remaining marker 142, the above-mentioned reference level Vc may be reset to a level lower than the maximal value of the resonance signal from the remaining marker 142 instead of changing the reception frequency of the loop antenna 23. After the position of the remaining marker 142 has been thus determined, the drill cutter 24 is actuated to start drilling with this marker 142 as the target.

Figure 33:
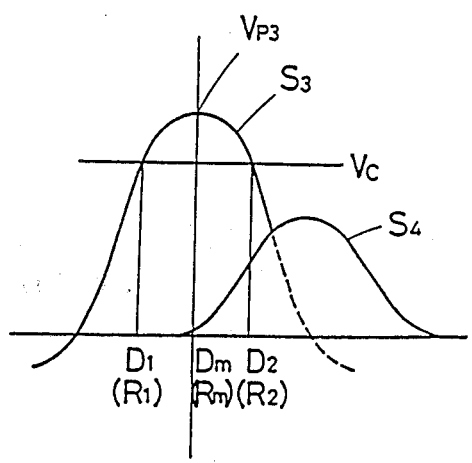

Then, in regard to the openings of the two branch pipes $A_3$ and $A_4$ shown at right in FIG. 28, too, apertures are successively drilled in the same manner for the respective branch pipes $A_3$ and $A_4$. FIG. 33 shows the waveforms of signal levels of resonance signals $S_3$ and $S_4$ in the above case.

In the above description, the position of marker 141 in the axial direction of main pipe B is detected by causing the loop antenna 23 to pass the vicinity of each of position markers 141 and 142 once to detect the maximal values $Vp_1$ and $Vp_2$ of signal levels of the respective resonance signals $S_1$ and $S_2$ and, then, driving the loop antenna 23 backward to detect the two base points $D_1$ and $D_2$. This procedure is intended to prevent an erroneous detection of base points $D_1$ and $D_2$ and to obtain the maximal values $Vp_1$ and $Vp_2$ of signal levels of the respective resonance signals $S_1$ and $S_2$ before setting of reference level Vc. Therefore, the sensitivity of the loop antenna 23 need not be set so high and when the maximal values $Vp_1$ and $Vp_2$ of signal level of the respective resonance signals $S_1$ and $S_2$ are known, it is sufficient to detect the two base points $D_1$ and $D_2$ in the first place and find the position of marker 141 in the axial direction of main pipe B.

In the above description, the maximal values of respective resonance signals are detected by setting a reference level according to the respective signal levels, finding two points where the respective signal levels reach the reference level and calculating a median point between these two points. Instead, the maximal value of signal level of each resonance signal may be directly detected without setting a reference level.

Furthermore, it may be so arranged that all the above detection procedures are controlled by a microcomputer.

Moreover, although, in the respective examples described above, pipe renovation has been taken as an example of lining technology, this is not an exclusive technology compatible with this invention. Thus, this invention is applicable, for example, to a lining method which comprises enlarging the opening of a manhole 32, lowering new pipes directly underground and feeding the new pipes transversely in succession or to the so-called reversion method (For example, see Japanese Patent Publication KOKAI No. 15852/1980).

As described above, the drilling method according to this invention is such that the opening of a branch line blocked by renovation lining can be accurately detected and drilled from within the main pipeline. Moreover, by means of the water plug of this invention used in conjunction with an antenna assembly, the opening of the branch line can be accurately located from the main pipeline side. Therefore, this drilling method is suited for drilling apertures for branch lines closed by internal lining in the renovation of an obsolete sewage, water supply, gas or other pipeline installed underground or within a structure.

We claim:
1. A method of drilling apertures for branch lines blocked by renovation lining of a main pipeline having branch lines which is characterized by
   a plug mounting step for setting a water plug in each of openings of said branch lines, said water plug carrying a position marker comprising an antenna coil and a resonator adapted to oscillate in response to a driving signal and, after stoppage of said driving signal, release a resonance signal remaining in said resonator from said antenna coil and said position marker being situated, upon setting of said water plug in position, in substantially concentric relation with the axis of the branch line,
   a marker detecting step which comprises causing an antenna assembly for detecting said resonance signal to travel within the main pipeline to detect the position of said marker, and
   an aperture drilling step which comprises driving a drilling means using said marker position as a target to drill an aperture for said branch line from within the main pipeline.

2. The method of drilling branch line apertures after renovation lining as claimed in claim 1 which is characterized in that said marker detecting step is such that, subsequent to said lining, an antenna assembly having a loop antenna for detecting the maximal value of said resonance signal in a position where its loop plane is perpendicular to the axis of the antenna coil of the position marker is caused to travel within the main pipeline to detect the position of said position marker.

3. The method of drilling branch line apertures after renovation lining as claimed in claim 1 which is characterized in that said marker detecting step is such that, subsequent to said lining, an antenna assembly having a loop antenna for detecting the minimal value of said resonance signal in a position where its loop plane is parallel to the axis of the antenna coil of said position marker is caused to travel within the main pipeline to detect the position of said marker.

4. The method of drilling branch line apertures after renovation lining as claimed in claim 1 which is characterized in that said marker detecting step is such that, subsequent to said lining, an antenna assembly including a first loop antenna for detecting the maximal value of said resonance signal in a position where its loop plane is perpendicular to the axis of the antenna coil of the position marker and a second loop antenna for detecting the minimal value of said resonance signal in a position where its loop plane is parallel to said axis is caused to travel within the main pipeline to thereby find the position of said position marker in the axial direction of the main pipeline according to the result of detection of said minimal value and, then, the position of said marker in the radial direction of the main pipeline according to the result of detection of said maximal value.

5. The method of drilling branch line apertures after renovation lining as claimed in claim 1 which is characterized in that said marker detecting step consists of the following two steps:
   (a) a step for detecting the position of said position marker in the axial direction of the main pipeline which comprises causing an antenna assembly having a loop antenna for detecting the maximal value of said resonance signal in a position where its loop plane is parallel to the axis of said main pipeline to travel within the main pipeline to find a base point which is the point where the signal level of said resonance signal detected by said loop antenna reaches a reference level set lower than said maximal value for the first time, then causing said antenna assembly to travel further in the direction from said base point to the point of said maximal value to find another base point which is the position where the signal level of said resonance signal reaches said reference level for a second time, and calculating a median point between said two base points, and (b) a step for detecting the position of said position marker in the radial direction of the main pipeline which comprises turning said loop antenna in the radial direction of the main pipeline with its loop plane being constantly directed against the circumferential wall of the main pipeline to find a base point which is the point where the signal level of said resonance signal detected by said loop antenna reaches a reference level set lower than said maximal value for the first time, then turning said loop antenna further in the direction from said base point to the position of detection of said maximal value to find another base point which is the position where the signal level of said resonance signal reaches said reference level for the second time, and calculating a median point between said two base points.

6. A method of drilling apertures for branch lines blocked by renovation lining of a main pipeline having branch lines which is characterized by setting a water plug in the opening of each branch line prior to said lining, said water plug carrying a position marker which includes an antenna coil and a resonator adapted to oscillate in response to a driving signal and, after stoppage of said driving signal, releases a resonance signal remaining in said resonator from said antenna coil, said position marker being situated, upon setting of said water plug in position, in substantially concentric relation with the axis of the branch line, and where the opening of branch lines are closely adjacent to each other, water plugs carrying position markers dessimilar in the frequency of resonance signal being set in the adjacent branch line openings, causing an antenna assembly having a loop antenna for detecting the maximal value of said resonance signal in a position where its loop plane is parallel to the axis of said main pipeline to travel within the main pipeline after said lining, tuning the reception frequency of said loop antenna to the frequency of the resonance signal from one of the plurality of position markers to detect the resonance signal from said marker and also detect the maximum value of said resonance signal to find the position of the particular markers, actuating a drilling means using the thus-detected position of said marker as a target to drill an aperture for the corresponding branch line from within the main pipe, repeating the same procedure of detecting resonance signals and their maximum values from position markers of water plugs set in the remaining branch line openings to identify the positions of the respective position markers and drill apertures for the respective branch lines with said drilling means using the detected positions of the respective markers as targets.

7. A water plug to be used in the method of drilling apertures for branch lines after renovation lining as claimed in claims 1, 2, 3, 4, 5 or 6 which is characterized in that a position marker comprising an antenna coil and a resonator adapted to osillate in response to a driving signal and, after stoppage of said resonator driving signal, release a resonance signal remaining in the resonator is disposed in such a manner that the axis of said antenna coil is substantially concentric with the axis of the branch line.

8. A water plug to be used in the method of drilling apertures for branch lines after renovation lining as claimed in claim 3 which is characterized in that a position marker comprising an antenna coil and a resonator adapted to oscillate in response to a driving signal and, after stoppage of said resonator driving signal, release a rasonance signal remaining in the resonator is disposed in such a manner that the axis of said antenna coil is perpendicular to the axis of the branch line and the center of said coil is concidental with the axis of the branch line.

* * * * *